(12) United States Patent
Liu et al.

(10) Patent No.: US 8,816,003 B2
(45) Date of Patent: Aug. 26, 2014

(54) HIGH PLASTICIZATION-RESISTANT CROSS-LINKED POLYMERIC MEMBRANES FOR SEPARATIONS

(75) Inventors: Chunqing Liu, Des Plaines, IL (US); Stephen T. Wilson, Des Plaines, IL (US); David A. Lesch, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 1373 days.

(21) Appl. No.: 12/145,153

(22) Filed: Jun. 24, 2008

(65) Prior Publication Data

US 2009/0318620 A1 Dec. 24, 2009

(51) Int. Cl.
*C08F 12/22* (2006.01)

(52) U.S. Cl.
USPC .............. 525/56; 525/343; 525/374; 525/403

(58) Field of Classification Search
USPC ................................... 525/56, 403, 343, 374
See application file for complete search history.

(56) References Cited

U.S. PATENT DOCUMENTS

| | | | | |
|---|---|---|---|---|
| 4,747,953 | A | * | 5/1988 | Zupancic et al. ............ 210/651 |
| 4,802,987 | A | | 2/1989 | Black ............................ 210/640 |
| 4,824,443 | A | * | 4/1989 | Matson et al. ..................... 95/44 |
| 4,932,986 | A | | 6/1990 | Kulkarni et al. ................ 55/158 |
| 6,112,908 | A | | 9/2000 | Michaels ..................... 210/506 |
| 6,635,104 | B2 | * | 10/2003 | Komkova et al. .................. 96/4 |
| 7,172,075 | B1 | | 2/2007 | ji .................................... 210/490 |
| 2003/0221559 | A1 | | 12/2003 | Koros et al. ....................... 96/10 |
| 2004/0261616 | A1 | | 12/2004 | Jorgensen et al. ................ 95/51 |
| 2004/0266026 | A1 | * | 12/2004 | Amiji et al. .................... 436/531 |
| 2008/0035572 | A1 | * | 2/2008 | Sabottke et al. ............. 210/651 |

FOREIGN PATENT DOCUMENTS

| WO | WO 2007/017085 A2 | 2/2007 |
|---|---|---|
| WO | WO-2008/021070 A2 * | 2/2008 |

OTHER PUBLICATIONS

Huang et al., Journal of Membrane Science, doi: 10.1016/j.memsci. 2006.09.045 (2006), in online version.*
Choudhari et al. (Journal of Membrane Science, vol. 302, pp. 197-206 (2007)).*
Sada et al., J. Polym. Sci. B: Polym. Phys., 26: 1035 (1988).
Sada et al., J. Polym. Sci. B: Polym. Phys., 28: 113 (1990).
Donohue et al., J. Membr. Sci. 42: 197 (1989).
Wind et al., Macromolecules, 36: 1882 (2003).
Patel et al., Adv. Fund. Mater., 14 (7): 699 (2004).
Patel et al., Macromol. Chem. Phy., 205: 2409 (2004).
Puleo et al., J. Membr. Sci., 47: 301 (1989).
Xiao et al., J. Membr. Sci. 2006.
Huang et al., J. Membr. Sci., 2006.
Choudhari et al., J. Membr. Sci., 2007.

\* cited by examiner

*Primary Examiner* — Vasu Jagannathan
*Assistant Examiner* — Henry Hu
(74) *Attorney, Agent, or Firm* — Mark Goldberg

(57) ABSTRACT

This invention involves a composition, a method of making, and an application of high plasticization-resistant chemically cross-linked polymeric membranes such as cross-linked cellulose acetate (CA) membrane. These cross-linked polymeric membranes with covalently interpolymer-chain-connected rigid networks showed no decrease in $CO_2/CH_4$ ideal selectivity under 690 kPa (100 psig) pure $CO_2$ pressure and also no $CO_2$ plasticization up to 3447 kPa (500 psig) pure $CO_2$ pressure. By using the method of chemical cross-linking as described in this invention, the separation characteristics of the polymeric membranes can be decisively improved. These new cross-linked polymeric membranes can be used not only for gas separations such as $CO_2/CH_4$ and $CO_2/N_2$ separations, $O_2/N_2$ separation, olefin/paraffin separations (e.g. propylene/propane separation), iso/normal paraffins separations, but also for liquid separations such as pervaporation and desalination.

7 Claims, No Drawings

HIGH PLASTICIZATION-RESISTANT CROSS-LINKED POLYMERIC MEMBRANES FOR SEPARATIONS

BACKGROUND OF THE INVENTION

This invention pertains to high plasticization-resistant chemically cross-linked polymeric membranes such as cross-linked cellulose acetate (CA) membranes and methods of making the same. This invention also pertains to applications of these cross-linked polymeric membranes not only for a variety of gas separations such as separations of carbon dioxide/methane, hydrogen/methane, oxygen/nitrogen, carbon dioxide/nitrogen, olefin/paraffin, iso/normal paraffins, polar molecules such as water, hydrogen sulfide and ammonia/mixtures with methane, nitrogen, or hydrogen and other light gases separations, but also for liquid separations such as pervaporation and desalination.

Membrane-based technologies have advantages of both low capital cost and high-energy efficiency compared to conventional separation methods. Polymeric membranes have proven to operate successfully in some industrial gas separations such as separation of $N_2$ from air and separation of $CO_2$ from natural gas. Cellulose acetate (CA) is one of a few polymers currently being used in commercial gas separations. For example, UOP's Separex™ CA membrane is extensively used for $CO_2$ removal from natural gas. Nevertheless, CA membranes are not without problems. They are limited in a number of properties including selectivity, permeability, chemical and thermal stability. For example, natural gas often contains substantial amounts of heavy hydrocarbons and water, either as entrained liquid, or in vapor form, which may lead to condensation within the membrane modules. The gas separation properties of CA membranes are damaged by contact with liquid hydrocarbons or/and liquid water. The presence of more than modest ppm levels of hydrogen sulfide, especially in conjunction with water and heavy hydrocarbons, is also potentially damaging. Therefore, precautions must be taken to remove the entrained liquid water and heavy hydrocarbons upstream of the membrane separation steps. Another issue of CA polymer membranes that still needs to be addressed for gas separations is the plasticization of CA polymer by condensable gases such as $CO_2$ and propylene ($C_3H_6$) that will therefore lead to swelling and significant increase in the permeabilities of all components in the feed and a decrease in the selectivity of CA membranes. For example, the permeation behavior of $CO_2$ in CA is unusual, compared to some other glassy polymers, in that after a certain pressure, the permeability coefficient begins to increase with pressure due to the onset of plasticization by the $CO_2$. The high concentration of sorbed $CO_2$ penetrant leads to increased segmental motions, and, consequently, the transport rate of the penetrant is also enhanced. The challenge of treating gas that contains relatively large amounts of $CO_2$, such as more than about 10%, is still particularly difficult. See Sada et al., J. POLYM. SCI. B: POLYM. PHYS., 26: 1035 (1988); Sada et al., J. POLYM. SCI. B: POLYM. PHYS., 28: 113 (1990); Donohue, et al., J. MEMBR. SCI., 42: 197 (1989).

Some new high-performance polymers such as polyimides (PIs), poly(trimethylsilylpropyne) (PTMSP), and polytriazole exhibit a high ideal selectivity for $CO_2$ over $CH_4$ when measured with pure gases at modest pressures in the laboratory. However, the selectivity obtained under mixed gas, high pressure conditions is much lower. In addition, gas separation processes based on glassy solution-diffusion membranes frequently suffer from plasticization of the stiff polymer matrix by the sorbed penetrant molecules such as $CO_2$ or $C_3H_6$. Plasticization of the polymer represented by membrane structure swelling and significant increase in the permeabilities of all components in the feed occurs above the plasticization pressure when the feed gas mixture contains condensable gases.

Thus, there is still a critical need for new high-performance membranes that will provide and maintain adequate performance under conditions of exposure to organic vapors, high concentrations of acid gases such as $CO_2$ and hydrogen sulfide, and water vapor that are commonplace in natural gas treatment.

Conventional methods for stabilizing polymeric membranes are either annealing or cross-linking. Cross-linking is a useful method to suppress polymer membrane plasticization. Polymer membrane cross-linking methods include thermal treatment, radiation, chemical cross-linking, UV-photochemical, etc. Cross-linking offers the potential to improve the mechanical and thermal properties of a membrane. Cross-linking can be used to increase membrane stability in the presence of aggressive feed gases and to simultaneously reduce plasticization of the membrane. Normally, cross-linked polymer membranes have a high resistance to plasticization. See Koros, et al., US 20030221559 (2003); Jorgensen, et al., US 2004261616 (2004); Wind, et al., Macromolecules, 36: 1882 (2003); Patel, et al., ADV. FUNC. MATER., 14 (7): 699 (2004); Patel, et al., MACROMOL. CHEM. PHY., 205: 2409 (2004).

In this invention, we disclose a chemical cross-linking method for the preparation of high plasticization-resistant chemically cross-linked polymeric membranes, and applications using the same. One goal of this invention is to reduce undesirable effects caused by condensable gases such as $CO_2$ and propylene ($C_3H_6$) induced plasticization (swelling) of polymeric membranes for gas separations. The polymer structure was stabilized by the incorporation of cross-linking agents and the formation of covalently interpolymer-chain-connected rigid networks.

SUMMARY OF THE INVENTION

This invention involves a composition, a method of making, and an application of high plasticization-resistant chemically cross-linked polymeric membranes such as cross-linked cellulose acetate (CA) membranes. These cross-linked polymeric membranes were prepared by cross-linking the polymeric membrane materials containing organic functional groups such as hydroxyl groups with the cross-linking agents containing two or more organic functional groups such as isocyanate groups in each molecules. The polymeric membrane materials react with the cross-linking agents to form covalently interpolymer-chain-connected cross-linked networks.

The degree of cross-linking in these high plasticization-resistant chemically cross-linked polymeric membranes as described in this invention can be controlled easily by adjusting the molar ratio of the polymeric membrane material to the cross-linking agent. The cross-linked polymeric membranes as described in this invention showed no $CO_2$ plasticization up to 3447 kPa (500 psig) $CO_2$ pressure. By using the method of chemical cross-linking as described in this invention, the separation characteristics of the polymeric membranes such as for $CO_2/CH_4$ separation can be considerably improved without a significant loss in $CO_2$ permeability.

The cross-linked polymeric membranes described in this invention are highly promising not only for a variety of gas separations such as separations of $CO_2/CH_4$, $CO_2/N_2$, olefin/paraffin separations (e.g. propylene/propane separation), $H_2/CH_4$, $O_2/N_2$, iso/normal paraffins, polar molecules such as $H_2O$, $H_2S$, and $NH_3$/mixtures with $CH_4$, $N_2$, $H_2$, and other light gases separations, but also for liquid separations such as desalination and pervaporations.

DETAILED DESCRIPTION OF THE INVENTION

Current polymeric membrane materials have reached a limit in their productivity-selectivity trade-off relationship for separations. In addition, gas separation processes based on glassy solution-diffusion membranes frequently suffer from plasticization of the stiff polymer matrix by the sorbed condensable penetrant molecules such as $CO_2$ or $C_3H_6$. Plasticization of the polymer represented by the membrane structure swelling and significant increase in the permeabilities of all components in the feed occurs above the plasticization pressure when the feed gas mixture contains condensable gases.

For example, for cellulose acetate (CA) membrane, the high solubility of $CO_2$ swells the polymer to such an extent that intermolecular interactions are disrupted. As a result, mobility of the acetyl and hydroxyl pendant groups, as well as small-scale main chain motions, would increase thereby enhancing the gas transport rates. See Puleo, et al., J. MEMBR. SCI., 47: 301 (1989). This result indicates a strong need to develop new plasticization-resistant membrane materials. The markets for membrane processes could be expanded considerably through the development of robust, high plasticization-resistant membrane materials. However, no effective method has been invented in the literature to reduce the plasticization of CA membrane so far.

Conventional methods for stabilizing the polymeric membranes against plasticization are either annealing or cross-linking. Polymeric membrane cross-linking methods include thermal treatment, radiation, chemical cross-linking, UV-photochemical, blending with other polymers, etc. See Koros, et al., US 20030221559 (2003); Jorgensen, et al., US 2004261616 (2004); Wind, et al., MACROMOLECULES, 36: 1882 (2003); Patel, et al., ADV. FUNC. MATER., 14 (7): 699 (2004); Patel, et al., MACROMOL. CHEM. PHY., 205: 2409 (2004).

This invention pertains to high plasticization-resistant chemically cross-linked polymeric membranes (or cross-linked polymeric dense films) such as cross-linked cellulose acetate (CA) polymeric membranes. More specifically, this invention pertains to a method for making these high plasticization-resistant chemically cross-linked polymeric membranes. This invention also pertains to the applications of these cross-linked polymeric membranes not only for a variety of gas separations such as separations of $CO_2/CH_4$, $CO_2/N_2$, olefin/paraffin separations (e.g. propylene/propane separation), $H_2/CH_4$, $O_2/N_2$, iso/normal paraffins, polar molecules such as $H_2O$, $H_2S$, and $NH_3$/mixtures with $CH_4$, $N_2$, $H_2$, and other light gases separations, but also for liquid separations such as desalination and pervaporations.

One major goal of this work is to reduce undesirable effects caused by condensable gases such as $CO_2$ and propylene ($C_3H_6$) induced plasticization (swelling) of polymeric membranes for gas separations. The polymer structure was stabilized by the incorporation of cross-linking agents and the formation of covalently interpolymer-chain-connected rigid networks.

The cross-linked polymeric membranes described in this invention can be prepared by cross-linking the polymeric membrane materials containing organic functional groups such as hydroxyl groups with cross-linking agents containing two or more organic functional groups such as isocyanate groups in each molecules. The organic functional groups such as hydroxyl or amino groups at the terminus or the side chains of the polymeric membrane materials react with the cross-linking agents to form covalently interpolymer-chain-connected cross-linked networks. These cross-linked polymeric membranes containing covalently interpolymer-chain-connected cross-linked networks can effectively reduce or stop the swelling of the polymers induced by condensable gases to such an extent that intermolecular interactions cannot be disrupted. As a result, the mobility of the polymer main chain can significantly decrease and thereby enhancing the stability of polymeric membrane against plasticization. The design of a successful cross-linked polymeric membranes described herein is based on the proper selection of the polymeric membrane material and the cross-linking agent.

The cross-linked polymeric membranes can be used in any convenient form such as sheets, tubes or hollow fibers.

The polymeric membrane material provides a wide range of properties important for membrane separations such as low cost, high selectivity, and easy processability. For the successful fabrication of cross-linked polymeric membranes, it is preferred that the polymeric membrane materials contain organic functional groups at the terminal ends or the side chains of the polymer backbones (also called macromolecular backbones). These organic functional groups can react with the cross-linking agents to form covalent bonds. The organic functional groups on the polymeric membrane materials can be hydroxyl (—OH), amino (—$NH_2$), imino (—RNH), epoxy (—CH(O)$CH_2$), isocyanate (—N=C=O), thiocyanate, isothiocyanate, anhydride (—COOOC—), acid anhydride, aldehyde (—CHO), dianhydride, amic acid, carboxylic acid (—COOH), or mixtures of two or more of these groups. It is also preferred that the polymeric membrane materials exhibit a carbon dioxide over methane selectivity of at least about 8, more preferably at least about 15 at 50° C. under 690 kPa (100 psig) pure carbon dioxide or methane pressure. The polymeric membrane material can be either a rubbery polymer or a rigid, glassy polymer containing one kind of or two or more kinds of organic functional groups as described above. The structure of the polymeric membrane materials can be linear, ladderlike, dendritic, or hyperbranched structure.

Examples of polymeric membrane materials used in the present invention include poly(ethylene glycol)s (PEG), poly (ethylene oxide)s (PEO), cellulose acetate (CA, with commercial designation of "EASTMAN" Cellulose Acetate (CA-398-3, 2.45 degree of substitution) from Eastman Chemical Company, Kingsport, Tenn.), cellulose triacetate (CTA, with commercial designation of "EASTMAN" Cellulose Triacetate (CA-435-75S, 2.84 degree of substitution) from Eastman Chemical Company, Kingsport, Tenn.), poly(vinyl alcohol) (PVA), poly(p-hydroxystyrene), poly(ethylene imine)s (PEI), poly(vinyl amine), poly(allyl amine), poly(propylene oxide)s (PPO), co-block-poly(ethylene oxide)-poly(propylene oxide)s (PEO-PPO), tri-block-poly(propylene oxide)-poly(ethylene oxide)-poly(propylene oxide)s (PPO-PEO-PPO), poly(propylene glycol)-block-poly(ethylene glycol)-block-poly(propylene glycol) bis(2-aminopropyl ether)s (PAPE), dendritic poly(amidoamine)s, linear, ladderlike, dendritic, and hyperbranched amine-terminated polyimides, linear, ladderlike, dendritic, and hyperbranched dianhydride-terminated polyimides, any types of polyimides with carboxylic acid groups or isocyanate groups, any types of polyamic acids, aldehyde modified polysulfone and polyethersulfone.

The cross-linking agents used to form covalent bonds with the polymeric membrane materials can be any compounds containing two or more organic functional groups such as hydroxyl (—OH), amino (—NH$_2$), imino (—RNH), epoxy (—CH(O)CH$_2$), isocyanate (—N=C=O), thiocyanate, isothiocyanate (—N=C=S), anhydride (—COOOC—), acid anhydride, aldehyde (—CHO), dianhydride, amic acid, or carboxylic acid (—COOH) group. The organic functional groups on the cross-linking agents should be different from the organic functional groups on the polymeric membrane materials and should be able to react with the organic functional groups on the polymeric membrane materials to form a cross-linked inter-polymer-chain network.

Examples of the cross-linking agents used in the present invention include tolylene-2,4-diisothiocyanate, tolylene-2,6-diisothiocyanate, tolylene-2,4-diisocyanate, tolylene-2,5-diisocyanate, tolylene-2,6-diisocyanate, tolylene-α,4-diisocyanate, 4,4'-methylenebis(phenyl isocyanate), terephthaldehyde, ethyleneglycol diglycidyl ether, 1,3-phenylene diisocyanate, 1,4-phenylene diisocyanate.

Some cross-linked polymeric membranes included in the present invention were fabricated as indicated in the following examples.

EXAMPLE 1

Preparation of Cross-Linked Cellulose Acetate (CA)-tolylene-2,4-diisocyanate polymeric Membrane (Abbreviated Herein as CA-TDI Membrane)

0.8 g (1.66 mmol of hydroxyl groups) of CA polymer ("EASTMAN" Cellulose Acetate (CA-398-3) from Eastman Chemical Company) was dissolved in 39.2 g of 1,4-dioxane solvent. 0.14 g (0.83 mmol) of tolylene-2,4-diisocyanate (TDI, from Sigma-Aldrich) was added to the CA solution. The solution was mixed for at least 2 hours at room temperature to form a homogeneous solution. The solution was then cast onto the surface of a clean glass plate, and the solvent was evaporated at 55° C. for at least 24 hours. The resulting cross-linked CA-TDI membrane was detached from the glass plate and further dried at 110° C. for at least 48 hours in vacuum.

EXAMPLE 2

Preparation of Cross-Linked Cellulose Acetate (CA)-Cellulose Triacetate (CTA)-tolylene-2,4-diisocyanate polymeric Membrane (Abbreviated Herein as CA-CTA-TDI Membrane)

0.4 g (0.83 mmol of hydroxyl groups) of CA polymer ("EASTMAN" Cellulose Acetate (CA-398-3) from Eastman Chemical Company) and 0.4 g (0.23 mmol of hydroxyl groups) of CTA polymer ("EASTMAN" Cellulose Triacetate (CA-435-75S) from Eastman Chemical Company) were dissolved in 39.2 g of 1,4-dioxane solvent. 0.10 g (0.53 mmol) of TDI (from Sigma-Aldrich) was added to the above CA-CTA solution. The solution was mixed for at least 2 hours at room temperature to form a homogeneous solution. The solution was then cast onto the surface of a clean glass plate, and the solvent was evaporated at 55° C. for at least 24 hours. The resulting cross-linked CA-CTA-TDI membrane was detached from the glass plate and further dried at 110° C. for at least 48 hours in vacuum.

EXAMPLE 3

Preparation of Cellulose Acetate (CA)-Cellulose Triacetate (CTA) (CA-CTA) Membrane (for Comparison Purpose)

0.5 g of CA polymer ("EASTMAN" Cellulose Acetate (CA-398-3) from Eastman Chemical Company) and 0.5 g of CTA polymer ("EASTMAN" Cellulose Triacetate (CA-435-75S) from Eastman Chemical Company) were dissolved in 20.0 g of 1,4-dioxane solvent. The mixture was stirred at room temperature for about 12 hours to form a homogeneous solution. The solution was cast onto the surface of a clean glass plate, and dried at room temperature for 24 hours. The resulting CA-CTA membrane was detached from the glass plate and further dried at 110° C. for at least 48 hours in vacuo.

EXAMPLE 4

CO$_2$/CH$_4$ Separation Performance of CA-CTA-TDI Membrane

In order to improve the plasticization resistance and to maintain the gas separation performance of polymeric membranes under high pressure and mixed gas containing heavy hydrocarbon impurities conditions, a new chemical cross-linking approach was studied in this invention. For example, by using tolylene-2,4-diisocyanate (TDI) as a cross-linking agent and by controlling the degree of cross-linking, the plasticization of CA and CA-CTA polymeric membranes by CO$_2$ can be effectively stopped up to 3447 kPa (500 psig) pure CO$_2$ pressure. The cross-linked CA and CA-CTA polymeric membranes as described in Examples 1 and 2 also have improved mechanical, chemical, thermal, and pressure stabilities compared to the un-cross-linked CA and CA-CTA membranes.

The permeabilities of CO$_2$ and CH$_4$ (P$_{CO2}$ and P$_{CH4}$) and ideal selectivity for CO$_2$/CH$_4$ ($\alpha_{CO2/CH4}$) of the CA-CTA and the cross-linked CA-CTA-TDI membranes were measured by pure gas measurements at 50° C. under 690 kPa (100 psig) single gas pressure. The results are summarized in Table 1. It has been demonstrated from pure gas permeation results as shown in Table 1 that the cross-linked CA-CTA-TDI membrane showed no significant loss in CO$_2$ permeability and CO$_2$/CH$_4$ selectivity compared to the un-cross-linked CA-CTA membrane at 50° C. under 690 kPa (100 psig).

TABLE 1

Pure gas permeation results for CA-CTA and cross-linked CA-CTA-TDI membranes for CO$_2$/CH$_4$ separation*

| Membrane | P$_{CO2}$ (Barrer) | P$_{CH4}$ (Barrer) | $\alpha_{CO2/CH4}$ |
|---|---|---|---|
| CA-CTA | 8.74 | 0.405 | 21.6 |
| Crosslinked CA-CTA-TDI | 7.68 | 0.367 | 20.9 |

*Tested at 50° C. and 690 kPa (100 psig); 1 Barrer = 10$^{-10}$ cm$^3$(STP) · cm/cm$^2$ · sec · cmHg To study the effect of TDI cross-linking on the plasticization resistance of CA-CTA membrane, the un-cross-linked CA-CTA and the cross-linked CA-CTA-TDI membranes were conditioned with CO$_2$ at different pressures. The change of CO$_2$ relative permeability with the increase of the applied CO$_2$ pressure at 50° C. was studied. It was seen that the un-cross-linked CA-CTA membrane exhibited 44% increase in CO$_2$ permeability under the applied CO$_2$ pressure of 3447 kPa (500 psig) compared to that under 690 kPa (100 psig) applied CO$_2$ pressure. When the applied CO$_2$ pressure increased to 5516 kPa (800 psig), the un-cross-linked CA membrane exhibited 149% increase in CO$_2$ permeability. This significant CO$_2$ permeability increase when the applied CO$_2$ pressure is approximately above 2068 kPa (300 psig) is due to the CO$_2$ plasticization (swelling) of CA and CTA polymers. By chemical cross-linking the CA-CTA membrane using tolylene-2,4-diisocyanate (TDI) cross-linking agent, no CO$_2$ plasticization was observed up to 3447 kpa (500 psig) pure CO$_2$ pressure. Even when the CO$_2$ pressure was increased to 5516 kPa (800 psig), only about 10% increase in $CO_2$ permeability was observed for the cross-linked CA-CTA-TDI membrane. The significant enhancement in $CO_2$ plasticization resistance for the cross-linked CA-CTA-TDI membrane compared to the un-cross-linked CA-CTA membrane is mainly attributed to the chemical cross-linking and formation of rigid covalently interpolymer-chain-connected cross-linked networks. These comparison results on CA-CTA and cross-linked CA-CTA-TDI membranes as shown in this study demonstrated that our chemical cross-linking approach described in this invention is an effective method to stop or significantly reduce the plasticization of polymeric membranes induced by condensable gases such as $CO_2$ or propylene up to very high applied pressure.

EXAMPLE 5

Preparation of Cross-Linked Cellulose Acetate (CA)-Cellulose Triacetate (CTA)-4,4'-methylenebis(phenyl isocyanate) polymeric Membrane (Abbreviated Herein as CA-CTA-MDI Membrane)

0.4 g (0.83 mmol of hydroxyl groups) of CA polymer ("EASTMAN" Cellulose Acetate (CA-398-3) from Eastman Chemical Company) and 0.4 g (0.23 mmol of hydroxyl groups) of CTA polymer ("EASTMAN" Cellulose Triacetate (CA-435-75S) from Eastman Chemical Company) were dissolved in 39.2 g of 1,4-dioxane solvent. 0.132 g (0.53 mmol) of 4,4'-methylenebis(phenyl isocyanate) (MDI) cross-linking agent (from Sigma-Aldrich) was added to the above CA-CTA solution. The solution was mixed for at least 2 hours at room temperature to form a homogeneous solution. The solution was then cast onto the surface of a clean glass plate, and the solvent was evaporated at 55° C. for at least 24 hours. The resulting cross-linked CA-CTA-MDI membrane was detached from the glass plate and further dried at 110° C. for at least 48 hours in vacuum.

EXAMPLE 6

$CO_2$/$CH_4$ Separation Performance of CA-CTA-MDI Membrane

The permeabilities of $CO_2$ and $CH_4$ ($P_{CO2}$ and $P_{CH4}$) and ideal selectivity for $CO_2$/$CH_4$ ($\alpha_{CO2/CH4}$) of the CA-CTA and the cross-linked CA-CTA-MDI membranes were measured by pure gas measurements at 50° C. under 690 kPa (100 psig) single gas pressure. The results are summarized in Table 2. It has been demonstrated from pure gas permeation results as shown in Table 2 that the cross-linked CA-CTA-MDI membrane showed $CO_2$ permeability comparable to that of the "control" un-crosslinked CA-CTA membrane and $CO_2$/$CH_4$ selectivity slightly higher than that of the "control" un-crosslinked CA-CTA membrane at 50° C. under 690 kPa (100 psig).

TABLE 2

Pure gas permeation results for CA-CTA and cross-linked CA-CTA-MDI membranes for $CO_2$/$CH_4$ separation*

| Membrane | $P_{CO2}$ (Barrer) | $P_{CH4}$ (Barrer) | $\alpha_{CO2/CH4}$ |
|---|---|---|---|
| CA-CTA | 8.74 | 0.405 | 21.6 |
| Crosslinked CA-CTA-MDI | 7.82 | 0.320 | 24.4 |

*Tested at 50° C. and 690 kPa (100 psig); 1 Barrer = $10^{-10}$ cm$^3$(STP) · cm/cm$^2$ · sec · cmHg To study the effect of MDI cross-linking on the plasticization resistance of CA-CTA membrane, the uncross-linked CA-CTA and the cross-linked CA-CTA-MDI membranes were conditioned with $CO_2$ at different pressures. The change of $CO_2$ relative permeability with the increase of the applied $CO_2$ pressure at 50° C. was studied. It was seen that the un-crosslinked CA-CTA membrane exhibited 44% increase in $CO_2$ permeability under the applied $CO_2$ pressure of 3447 kPa (500 psig) compared to that under 690 kPa (100 psig) applied $CO_2$ pressure. When the applied $CO_2$ pressure increased to 5516 kPa (800 psig), the un-cross-linked CA membrane exhibited 149% increase in $CO_2$ permeability due to the $CO_2$ plasticization (swelling) of CA and CTA polymers. By chemical cross-linking the CA-CTA membrane using MDI cross-linking agent, no $CO_2$ plasticization was observed up to 3447 kPa (500 psig) pure $CO_2$ pressure. Even when the $CO_2$ pressure was increased to 5516 kPa (800 psig), only about 41% increase in $CO_2$ permeability was observed for the cross-linked CA-CTA-MDI membrane. The significant enhancement in $CO_2$ plasticization resistance for the cross-linked CA-CTA-MDI membrane compared to the un-crosslinked CA-CTA membrane is mainly attributed to the chemical cross-linking and formation of rigid covalently interpolymer-chain-connected cross-linked networks. These comparison results on CA-CTA and cross-linked CA-CTA-MDI membranes further demonstrated that our chemical cross-linking approach described in this invention is a novel effective method to stop or significantly reduce plasticization of polymeric membranes induced by condensable gases such as $CO_2$ or propylene up to very high applied pressure.

In summary, the high plasticization-resistant cross-linked polymeric membranes described in this invention such as the cross-linked CA-CTA-TDI membrane contain covalently interpolymer-chain-connected cross-linked networks. $CO_2$ plasticization tests demonstrated that the covalently cross-linked network structures in the cross-linked membranes described in this invention effectively stopped the swelling of the polymer to such an extent that intermolecular interactions cannot be disrupted under $CO_2$ pressure up to 3447 kPa (500 psig). As a result, stable polymeric membranes against plasticization were successfully achieved by the chemical cross-linking approach described in this invention.

The high plasticization-resistant cross-linked polymeric membranes described in this invention such as CA-CTA-TDI and CA-CTA-MDI membranes can be used in any convenient form such as sheets, tubes or hollow fibers for a variety of liquid and gas separations such as separations of $CO_2$/$CH_4$, $H_2$/$CH_4$, $O_2$/$N_2$, $CO_2$/$N_2$, olefin/paraffin, iso/normal paraffins, polar molecules such as $H_2O$, $H_2S$, and $NH_3$/mixtures with $CH_4$, $N_2$, $H_2$, and other light gases separations, as well as desalination and pervaporation applications. The high plasticization-resistant cross-linked polymeric membranes of the present invention are especially useful in gas separation processes in petrochemical, refinery, and natural gas industries. Examples of such separations include separation of $CO_2$ from natural gas or flue gas, $H_2$ from $N_2$, $CH_4$, and Ar in ammonia purge gas streams, $H_2$ recovery in refineries, olefin/paraffin separations such as propylene/propane separation, and iso/normal paraffins separations.

The invention claimed is:

1. A process for preparation of a cross-linked plasticization-resistant gas separation membrane comprising first reacting a polymeric membrane material with a cross-linking agent in an organic solvent and then drying the cross-linked polymeric membrane material by removing the organic solvent to form the cross-linked plasticization-resistant gas separation membrane wherein said polymeric membrane material is selected from the group consisting of poly(ethylene glycol)s, poly(ethylene oxide)s, cellulose acetate, cellulose triacetate, poly(vinyl alcohol), poly(p-hydroxystyrene), poly(ethylene imine)s, poly(vinyl amine), poly(allyl amine), poly(propylene oxide)s, co-block-poly(ethylene oxide)-poly (propylene oxide)s, tri-block-poly (propylene oxide)-poly (ethylene oxide)-poly(propylene oxide)s, poly(propylene glycol)-block-poly(ethylene glycol)-block-poly(propylene glycol) bis(2-aminepropyl ether)s, polyamic acids, and mixtures thereof and wherein said cross-linking agent is selected from the group consisting of tolylene-2,4-diisothiocyanate, tolylene 2,6-diisothiocyanate, tolylene-2,4-diisocyanate, tolylene-2,5-diisocyanate, tolylene-2,6-diisocyanate, tolylene-α, 4-diisocyanate, terephthaldehyde, ethyleneglycol diglycidyl ether, 1,3-phenylene diisocyanate, 4,4'-methylenebis(phenyl isocyanate), and 1,4-phenylene diisocyanate.

2. The process of claim 1 wherein said polymeric membrane material is selected from the group consisting of poly (ethylene glycol)s, poly(ethylene oxide)s, cellulose acetate, cellulose triacetate, poly(vinyl alcohol), poly(p-hydroxystyrene), poly(propylene oxide)s, co-block-poly(ethylene oxide)-poly(propylene oxide)s, tri-block-poly(propylene oxide)-poly(ethylene oxide)-poly(propylene oxide)s, poly (propylene glycol)-block-poly(ethylene glycol)-block-poly (propylene glycol) bis(2-aminepropyl ether)s, and mixtures thereof.

3. The process of claim 1 wherein said polymeric membrane material is cellulose acetate, cellulose triacetate, or a mixture of cellulose acetate and cellulose triacetate.

4. The process of claim 1 wherein said cross-linking agent is selected from the group consisting of terephthaldehyde and ethyleneglycol diglycidyl ether.

5. The process of claim 1 wherein said cross-linking agent is tolylene-2,4diisocyanate or 4,4'-methylenebis(phenyl isocyanate).

6. The process of claim 1 wherein said cross-linked plasticization-resistant gas separation membrane is in a form selected from the group consisting of sheets, tubes or hollow fibers.

7. The process of claim 1 wherein said cross-linked plasticization-resistant gas separation membrane is a cross-linked inter-polymer-chain network.

* * * * *